J. W. COLLINS,

Assignor of one-half interest to B. C. BIBB.

Hot-Air Register.

No. 8,570. Reissued Feb. 4, 1879.

WITNESSES

Harry King

W. C. Jordinston

INVENTOR

John W. Collins,

By L. Price

His ATTORNEY

N. PETERS, PHOTO-LITHOGRAPHER, WASHINGTON, D. C.

UNITED STATES PATENT OFFICE.

JOHN W. COLLINS, OF WASHINGTON, DISTRICT OF COLUMBIA, ASSIGNOR OF ONE-HALF INTEREST TO BENTLEY C. BIBB, OF BALTIMORE, MARYLAND.

IMPROVEMENT IN HOT-AIR REGISTERS.

Specification forming part of Letters Patent No. 186,081, dated January 9, 1877; Reissue No. 8,570, dated February 4, 1879; application filed November 4, 1878.

*To all whom it may concern:*

Be it known that I, JOHN W. COLLINS, of Washington, in the county of Washington and District of Columbia, have invented a certain new and useful Improvement in Hot-Air Registers; and I do hereby declare the following to be a full, clear, and exact description of the same, reference being had to the accompanying drawings, forming part of this specification, in which—

Figure 1:
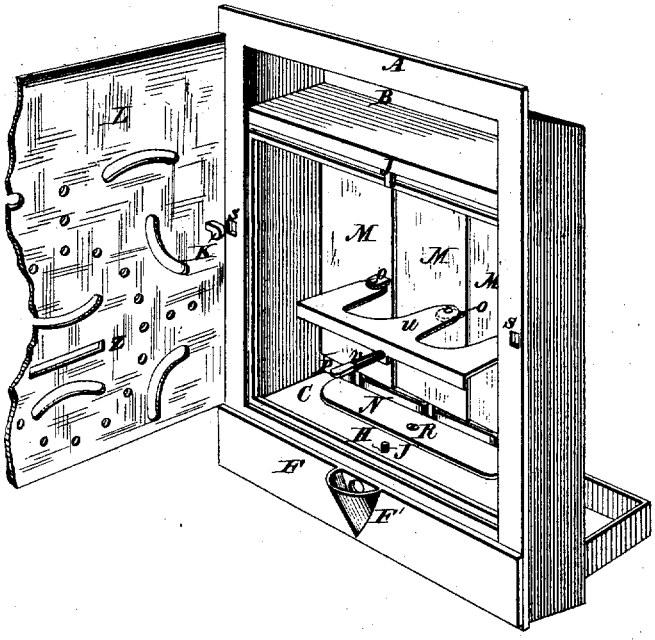
Figure 3:
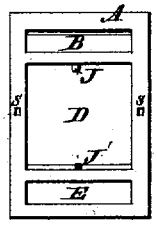
Figure 2:
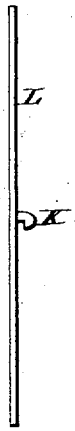

Figure 1 is a perspective view of a hot-air register, partly in section, showing one method of carrying out my invention. Fig. 2 is an edge view of a face-plate to be applied to the permanent frame; and Fig. 3 is a front elevation of the register or permanent frame.

My invention relates to that class of hot-air registers which employ a permanent frame embedded in the wall, a series of slats or valves removable from the permanent frame, and a removable face-plate connected to the permanent frame and adapted to hold the valves in position and close the front of the opening. All prior inventions of the class referred to have been liable to the serious objection that the face-plate and valves could not be applied to and removed from the permanent frame without danger of marring or defacing the wall around the register-opening. This objection has resulted from one of two defects in the construction—namely, first, the permanent frame has been unprovided with a face-flange to protect the wall in applying or removing the face-plate and valves; or, secondly, where a face-flange has been employed, the face-plate and valves have been hinged directly thereto, so that when the latter have been swung open their whole weight was thrown on the hinges and tended to loosen the permanent frame from its seat, and thus deface the wall.

The object of my invention is to obviate the objection alluded to; and to this end it consists, first, in the combination of a permanent frame having an outwardly-projecting face-flange, a removable secondary frame carrying the slats or valves, and a removable face-plate adapted to be attached to the flange of the permanent frame, whereby the face-plate and slat-frame can be removed and replaced without marring or defacing the wall, either by coming in direct contact therewith or by loosening the permanent frame.

It also consists in providing the register with a hand-hole, by which access may be had to the flues or pipes without disturbing the permanent frame.

And it consists, lastly, in the combination, with the register, of a removable evaporator of peculiar construction, all which I will now proceed to describe.

In the accompanying drawings, A is the register-frame, made of the requisite depth and size to receive the slats, and set permanently in a wall or chimney to connect with the air-flues. M M are the slats, which, in this example of my invention, are journaled in a frame, C, fitting within the register-frame, said frame C being kept in place by any suitable means which will admit of its ready removal.

As shown in the drawings, it is held within the permanent frame by one or more upper lugs, J, thereon, and one or more bottom slots, H, adapted to fit over lugs J′ on the lower part of said frame. The slat-frame drops down over such lug J′ when applied to its place, and is removed by simply lifting it off the lug, as will be readily understood.

If desired, the slat-frame may be secured in place by screws instead of the lugs and slots. The face L may be made so as to cover the register and hand-hole in one piece, or it may be made in two pieces to cover them separately. That part of the face which covers the hand-hole may be used for a name-plate. The slat-frame C may be cast in a single piece, or it may be constructed of several pieces fastened together in any convenient manner.

Either the upper or the lower part of the slat-frame C is perforated with a suitable number of holes, in which the pivots on one end of the slats are inserted, and the opposite end of the slat-frame is provided with a ledge or flange, P, having indentations, into which the pivots on the opposite ends of the slats are made to fit, and are held in their respective places by a small plate, N, the edge of which is made to rest against the pivots. This plate is attached to the slat-frame by one or more screws, R. The removal of this screw or screws R enables the slats to be taken out and detached entirely from the slat-frame and from the register.

Each of the slats M is provided with a lug, O, near its center. These lugs are furnished with pivot-holes, through which rivets or screws may be inserted to fasten the plate U and the slats M together, and by means of the handle V, which protrudes through a slot, Z, in the face L, the slats may be opened or shut, either to admit the air into or to cut it off from the apartment.

It is obvious that the register-frame may be cast in a single piece, or that it may be made of several pieces, and that the face L may be attached thereto in various ways.

The drawer F is provided with a lip, F′, through which it may be filled with water without removing it from the register.

I claim as my invention—

1. The combination of the permanent frame having an outwardly-projecting face-flange, a removable secondary frame carrying the slats or valves, and a removable face-plate adapted to be attached to the flange of the permanent frame, whereby the face-plate and slat-frame can be removed and replaced without marring or defacing the wall, either by coming in direct contact therewith or by loosening the permanent frame, substantially as described.

2. An air-register the permanent frame of which is constructed with a hand-hole, B, substantially as described, for the purpose specified.

3. The combination, in an air-register, A, of hand-hole B, movable slat-frame C, and evaporator F, provided with a lip, F′, as shown and described, and for the purposes set forth.

JOHN W. COLLINS.

Witnesses:
MELVILLE CHURCH,
W. C. JIRDINSTON.